United States Patent
O'Donnell et al.

(10) Patent No.: US 10,697,507 B2
(45) Date of Patent: Jun. 30, 2020

(54) GEAR PROTECTION SUBASSEMBLY

(71) Applicant: Performance Gear Systems, Inc., Plainfield, IL (US)

(72) Inventors: Pat O'Donnell, Plainfield, IL (US); Steve Schmutzler, Homer Glen, IL (US)

(73) Assignee: PERFORMANCE GEAR SYSTEMS, INC., Plainfield, IL (US)

( * ) Notice: Subject to any disclaimer, the term of this patent is extended or adjusted under 35 U.S.C. 154(b) by 30 days.

(21) Appl. No.: 15/911,619

(22) Filed: Mar. 5, 2018

(65) Prior Publication Data
US 2018/0252281 A1    Sep. 6, 2018

Related U.S. Application Data

(60) Provisional application No. 62/467,581, filed on Mar. 6, 2017.

(51) Int. Cl.
| | | |
|---|---|---|
| F16D 65/12 | (2006.01) | |
| B60T 1/06 | (2006.01) | |
| F16D 13/12 | (2006.01) | |
| F16D 51/32 | (2006.01) | |
| F16D 67/02 | (2006.01) | |
| F16D 51/20 | (2006.01) | |

(Continued)

(52) U.S. Cl.
CPC .............. F16D 65/12 (2013.01); B60T 1/062 (2013.01); F16D 13/12 (2013.01); F16D 51/10 (2013.01);
(Continued)

(58) Field of Classification Search
CPC .. F16D 65/12; F16D 2055/0004; F16D 13/12; F16D 51/32; F16D 67/02;
(Continued)

(56) References Cited

U.S. PATENT DOCUMENTS

| 1,843,620 A | 2/1932 | Norton | |
|---|---|---|---|
| 3,945,478 A * | 3/1976 | Kellerman | .............. F16D 43/18 |
| | | | 192/105 CD |

(Continued)

FOREIGN PATENT DOCUMENTS

| DE | 10334555 A1 | 2/2005 |
|---|---|---|
| EP | 0732520 A1 | 9/1996 |
| GB | 719486 A | 12/1954 |

OTHER PUBLICATIONS

International Search Report and Written Opinion for related International Application No. PCT/US18/20895; dated May 29, 2018; (10 pages).

(Continued)

*Primary Examiner* — Pamela Rodriguez
(74) *Attorney, Agent, or Firm* — K&L Gates LLP

(57) ABSTRACT

Brake discs, systems, and methods may include a brake disc and a brake drum. In various embodiments, the brake disc includes a central hub, configured to engage with an axial shaft. The brake disc includes protrusions, each of which is coupled to the central hub and extends perpendicularly from the central hub. The brake disc includes expansion components, each of which is coupled to the central hub at two locations. Each expansion component surrounds an outer periphery of one of the protrusions. The expansion components define a segmented periphery configured as a braking surface. The brake drum is configured to have an inner diameter that is larger than an outer diameter of the brake disc. The outer diameter of the brake disc is defined by the segmented periphery, such that an inner surface of the brake drum is concentric around the segmented periphery of the brake disc.

19 Claims, 6 Drawing Sheets

(51) Int. Cl.
*F16D 51/10* (2006.01)
*F16D 65/02* (2006.01)
*F16D 55/00* (2006.01)
*F16D 121/16* (2012.01)

(52) U.S. Cl.
CPC .............. *F16D 51/20* (2013.01); *F16D 51/32* (2013.01); *F16D 67/02* (2013.01); *F16D 2055/0004* (2013.01); *F16D 2065/13* (2013.01); *F16D 2121/16* (2013.01)

(58) Field of Classification Search
CPC ...... F16D 51/20; F16D 51/10; F16D 2065/13; F16D 2121/16; B60T 1/062
USPC ........ 188/18 A, 218 XL, 71.1, 73.31, 218 R; 192/76, 105 BA, 103 B, 104 B, 107 R, 192/107 T, 107 C, 107 M
See application file for complete search history.

(56) References Cited

U.S. PATENT DOCUMENTS

| | | | |
|---|---|---|---|
| 3,955,650 A | 5/1976 | Ellis | |
| 4,016,964 A * | 4/1977 | Dietzsch | F16D 43/18 192/105 CD |
| 5,697,476 A | 12/1997 | Susmark | |
| 6,148,979 A * | 11/2000 | Roach | F16D 41/12 192/45.1 |
| 10,329,120 B2 * | 6/2019 | Dube | B66B 5/044 |
| 2003/0010594 A1 | 1/2003 | Howell et al. | |

OTHER PUBLICATIONS

Preliminary Report on Patentability for related International Application No. PCT/US18/20895; report dated Sep. 10, 2019; (8 pages).

* cited by examiner

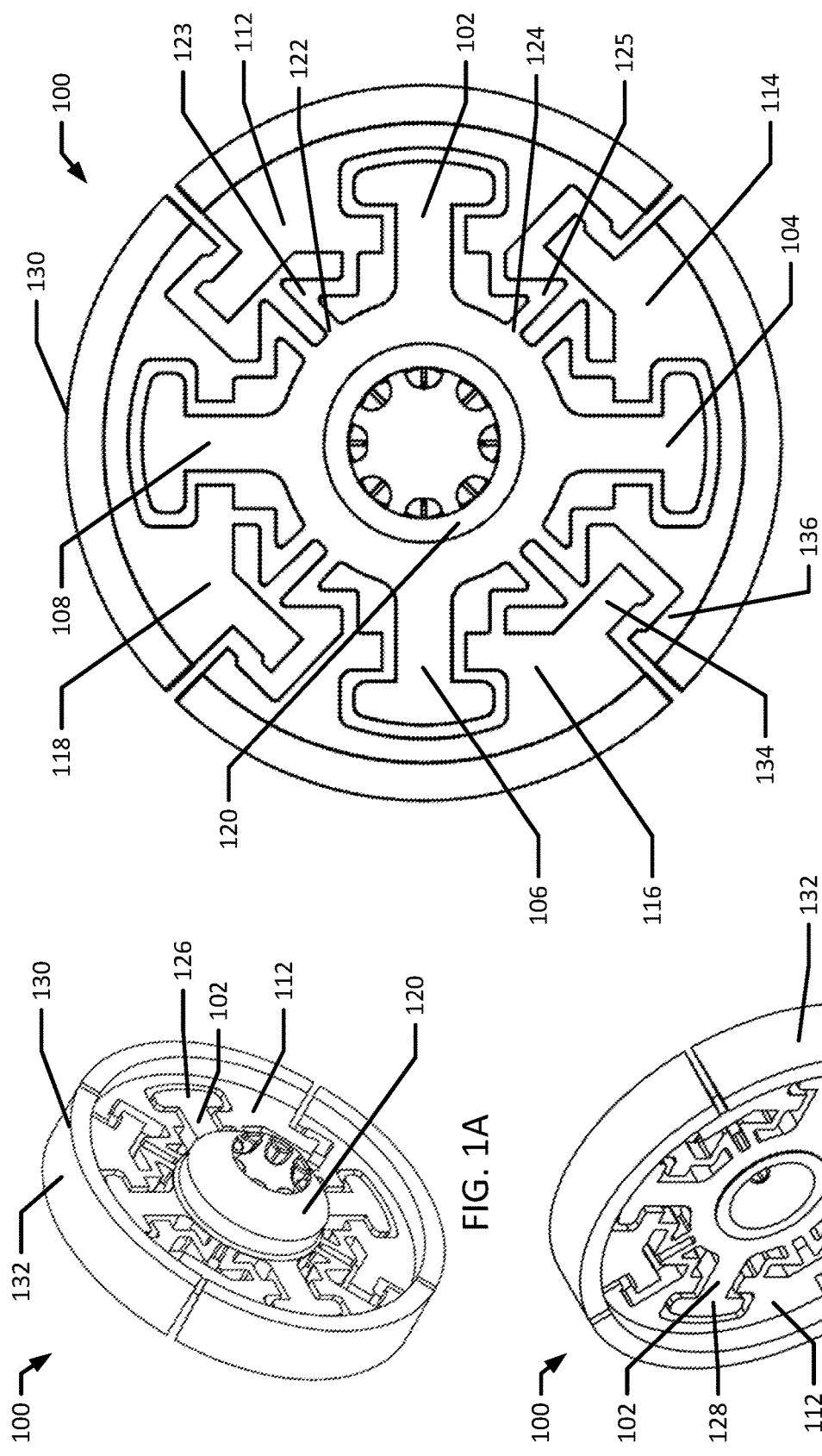

GEAR PROTECTION SUBASSEMBLY

PRIORITY CLAIM

This application claims priority to U.S. Provisional Patent Application No. 62/467,581 filed Mar. 6, 2017, entitled "GEAR PROTECTION SUBASSEMBLY," the entire contents of which are incorporated herein by reference.

BACKGROUND

Beginning chiefly in the 1990's, automobiles having liftgates began to incorporate powered liftgate assemblies, so that the liftgate could be opened and closed at the touch of a button. Typically, powered liftgate assemblies require a compact design, and frequently implement a power strut to open and close the liftgate. Given size constraints of the system, power struts are typically very compact and lightweight in design, and consequently sometimes use plastic or other polymer materials for the gears that communicate power between a motor and the strut to open the liftgate. Though these materials and the related configuration are sufficient for use of the power strut as intended, they may fail if subjected to excessive forces encountered during foreseeable misuse (e.g., when the liftgate is manually opened or closed at high speed and rapidly stopped, rather than powered to open or close as designed). In particular, application of excessive force can result in high-speed conditions for rotating parts, which are then frequently driven to a hard-stop subsequently damaging the rotating parts, the motor, the struts, or a combination of these components.

Typically, approaches to overcoming problems associated with the durability of a power strut are focused on strengthening the materials and components of the strut itself. Such an approach is hindered by the physical constraints of the power strut system: requiring systems to be very compact and lightweight in design. There is a need, therefore, to overcome the foregoing problems while at the same time providing a lightweight, compact design that can simultaneously provide enhanced durability to a power strut while also being economical to manufacture, easy to use, and durable.

SUMMARY

In an embodiment, a gear protection subassembly is provided in a power lift mechanism. For example, a brake disc is provided, with or without related components such as a brake drum, an axial shaft, and a motor. The brake disc provided in an embodiment of the disclosed subassembly limits the force that can be transmitted to the gearing that communicates power to the lift mechanism (e.g., the axial shaft, the motor, and other related power transfer components). Specifically, the brake disc is constructed and arranged to govern the rotational speed at which the system moves (e.g., the brake disc provides for a maximum operating RPM). By governing the rotational speed, situations involving high-speed conditions are avoided, thus avoiding hard-stops from high-speed conditions that often result in damage to rotating parts. More generally, it should be appreciated that brake disc can be implemented with any rotational system, where rotational speed needs to be governed.

The brake disc of various embodiments of the disclosed assembly employs an expanding brake disc design. By expanding outwardly in a centrifugal direction, where the amount of expansion increases with increasing rotational speed, the brake disc design of the disclosed subassembly provides an increasing braking force on a drum encircling the disc. Through this increasing force, the brake disc limits the maximum speed of the subassembly, thereby limiting the forces that can be imparted to the power lift mechanism through unintended, manual operation. Expansion amount at particular speeds, and related braking force, may be specifically dictated by the geometric configuration of the brake disc.

For example, in one embodiment of the disclosed apparatus, the gear protection subassembly may protect a powered lift apparatus from being subjected to excessive forces, such as overpowering due to the application of force from an unintended source of power. Specifically, the device can be adapted to a power liftgate strut mechanism, which is designed to be electrically operated, but is frequently manually lifted using excessive force in such a manner that, without inclusion of the disclosed subassembly, is likely to damage the power transfer apparatus. By incorporating an inertial brake that limits the maximum speed the drive components experience, the subassembly prevents excessive force from reaching the drive components of the powered strut and thereby damaging those components.

Thus, it is an object of the present disclosure to provide, in combination with the other features and advantages disclosed herein, a compact and lightweight gear protection subassembly that is resistant to misuse and prevents excessive, damaging forces from being transmitted to the strut through unintended, manual operation. The gear protection subassembly can be easily implemented into existing systems (e.g., via installation of a brake disc and brake drum onto an existing axial shaft). Likewise, the gear protection subassembly can be easily repaired (e.g., via replacement of a brake disc without the need to replace other assemblies, such as a brake drum). In various embodiments, the gear protection subassembly is configurable in the sense that the arrangement, size, and weight of the expansion mechanism can be modified to provide for a braking force at a desired speed in RPM. The gear protection subassembly provides the foregoing advantages while at the same time being easy and convenient to operate and economical to manufacture. As noted, though the subassembly is configured for "gear protection," it should be appreciated that the subassembly can be implemented with any rotational system, where rotational speed needs to be governed.

In a first aspect of the present disclosure, which may be combined with any other aspect listed herein unless specified otherwise, a brake disc includes a central hub, a plurality of protrusions, and a plurality of expansion components. The central hub is configured to engage with an axial shaft. Each of the plurality of protrusions is coupled to the central hub and extends perpendicularly or otherwise outwardly from the central hub. In this embodiment, each of the plurality of expansion components is coupled to the central hub at two locations. Each of the plurality of expansion components surrounds an outer periphery of one of the plurality of protrusions. The plurality of expansion components define a segmented periphery configured as a braking surface.

In a second aspect of the present disclosure, which may be combined with any other aspect listed herein unless specified otherwise, the central hub engages with the axial shaft via a pinion gear.

In a third aspect of the present disclosure, which may be combined with any other aspect listed herein unless specified otherwise, each of the plurality of expansion components is coupled to the central hub at two locations by flex-hinge components, which are geometrically configured to permit each of the plurality of expansion components to flex in a centrifugal direction.

In a fourth aspect of the present disclosure, which may be combined with any other aspect listed herein unless specified otherwise, a cross-sectional area of any one of the plurality of expansion components is reduced at the flex-hinge components.

In a fifth aspect of the present disclosure, which may be combined with any other aspect listed herein unless specified otherwise, each of the plurality of expansion components includes a latch arm configured to engage with at least one other of the plurality of expansion components.

In a sixth aspect of the present disclosure, which may be combined with any other aspect listed herein unless specified otherwise, the segmented periphery is further configured to retain an O-ring.

In a seventh aspect of the present disclosure, which may be combined with any other aspect listed herein unless specified otherwise, the segmented periphery is further configured to include a plurality of deflection features.

In a eighth aspect of the present disclosure, which may be combined with any other aspect listed herein unless specified otherwise, each of the plurality of protrusions is configured to include a first portion and a second portion. The first portion has a first cross-sectional area, a first length, and is coupled to the central hub and extends perpendicularly from the central hub. The second portion has a second cross-sectional area, a second length, the second cross-sectional area being greater than the first cross-sectional area, and is coupled to the first portion and extends perpendicularly from the first portion.

In a ninth aspect of the present disclosure, which may be combined with any other aspect listed herein unless specified otherwise, the plurality of protrusions includes four protrusions and the plurality of expansion components includes four expansion components.

In tenth aspect of the present disclosure, which may be combined with any other aspect listed herein unless specified otherwise, a brake system includes a brake disc and a brake drum. The brake disc includes a central hub, a plurality of protrusions, and a plurality of expansion components. The central hub is configured to engage with an axial shaft. Each of the plurality of protrusions is coupled to the central hub and extends perpendicularly or otherwise outwardly from the central hub. Each of the plurality of expansion components is coupled to the central hub at two locations. Each of the plurality of expansion components surrounds an outer periphery of one of the plurality of protrusions. The plurality of expansion components define a segmented periphery configured as a braking surface. The brake drum is configured to have an inner diameter that is larger than an outer diameter of the brake disc. The outer diameter of the brake disc is defined by the segmented periphery. An inner surface of the brake drum is concentric around the segmented periphery of the brake disc.

In an eleventh aspect of the present disclosure, which may be combined with any other aspect listed herein unless specified otherwise, the brake disc is configured to rotate with the axial shaft, and wherein the brake drum is configured to be rotationally fixed, such that the brake drum does not rotate.

In a twelfth aspect of the present disclosure, which may be combined with any other aspect listed herein unless specified otherwise, the segmented periphery of the brake disc is configured to contact the inner surface of the brake drum.

In a thirteenth aspect of the present disclosure, which may be combined with any other aspect listed herein unless specified otherwise, contact between the segmented periphery of the brake disc and the inner surface of the brake drum is caused responsive to at least one of the plurality of expansion components flexing in a centrifugal direction.

In a fourteenth aspect of the present disclosure, which may be combined with any other aspect listed herein unless specified otherwise, the segmented periphery of the brake disc is further configured to retain an O-ring, such that the O-ring is configured to contact the inner surface of the brake drum.

In a fifteenth aspect of the present disclosure, which may be combined with any other aspect listed herein unless specified otherwise, each of the segmented periphery of the brake disc and the inner surface of the brake drum are configured to include a plurality of deflection features, such that the plurality of deflection features of the segmented periphery are configured to contact the plurality of deflection features of the inner surface of the brake drum.

In a sixteenth aspect of the present disclosure, which may be combined with any other aspect listed herein unless specified otherwise, the system further comprises a brake cover, wherein the brake cover is configured to engage with the brake drum, such that the brake disc is fully enclosed by the brake cover and the brake drum.

In a seventeenth aspect of the present disclosure, which may be combined with any other aspect listed herein unless specified otherwise, the axial shaft is driven by a motor.

In a eighteenth aspect of the present disclosure, which may be combined with any other aspect listed herein unless specified otherwise, the brake disc is manufactured from a polyester.

In a nineteenth aspect of the present disclosure, which may be combined with any other aspect listed herein unless specified otherwise, the brake housing is manufactured from a resin.

In a twentieth aspect of the present disclosure, which may be combined with any other aspect listed herein unless specified otherwise, a method of braking includes rotating a brake disc that is engaged concentrically on an axial shaft. The brake disc includes a central hub, a plurality of protrusions, and a plurality of expansion components. The central hub is configured to engage with the axial shaft. Each of the plurality of protrusions is coupled to the central hub and extends perpendicularly from the central hub. Each of the plurality of expansion components is coupled to the central hub at two locations. Each of the plurality of expansion components surrounds an outer periphery of one of the plurality of protrusions. The plurality of expansion components define a segmented periphery configured as a braking surface. The method includes flexing at least one of the plurality of expansion components in a centrifugal direction. The method includes causing contact between the at least one of the plurality of expansion components and an inner surface of a brake drum. The contact between the at least one of the plurality of expansion components and the inner surface of the brake drum generates friction sufficient to limit rotational speed of the axial shaft.

Numerous additional features and advantages of the present invention will become apparent to those skilled in the art upon consideration of the following Detailed Description and the Figures.

BRIEF DESCRIPTION OF THE FIGURES

FIG. 1A illustrates a front-isometric view of a brake disc according to an example of the present disclosure.

FIG. 1B illustrates a back-isometric view of a brake disc according to an example of the present disclosure.

FIG. 1C illustrates a front view of a brake disc according to an example of the present disclosure.

DETAILED DESCRIPTION OF EXAMPLE EMBODIMENTS

Figure 2A:
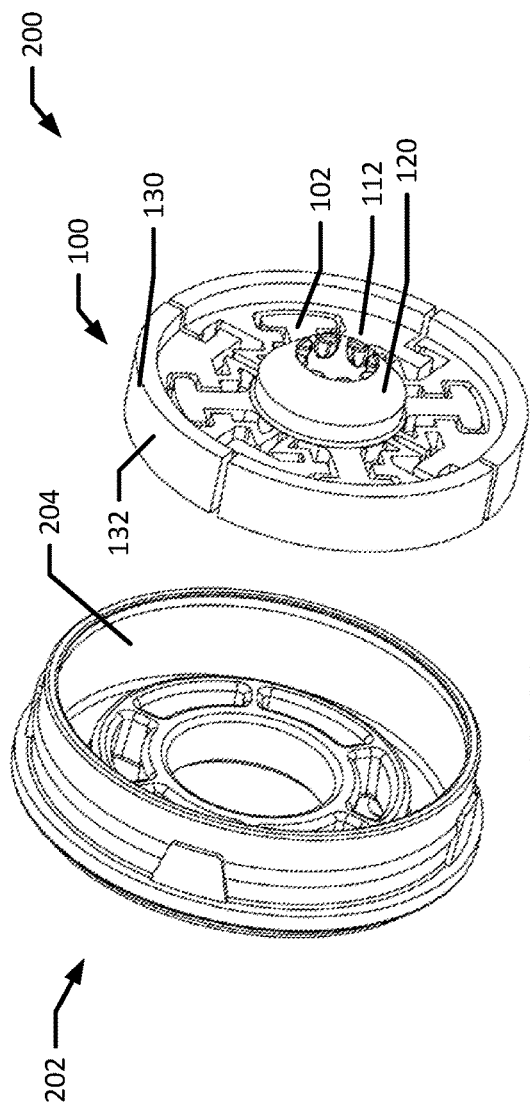
FIG. 2A illustrates a front-isometric view of a brake system according to an example of the present disclosure.

The following provides a detailed description of the gear protection subassembly. In a preferred embodiment, a brake is provided which limits the force that can be transmitted to the gearing that communicates power to the lift mechanism. The brake is constructed and arranged to govern the speed at which the gearing moves. In particular, in a preferred embodiment, the brake governs the speed at which the gearing moves by selectively expanding (depending on its geometry) to contact a brake drum at a desired, "maximum" rotational speed. In other embodiments, the brake is implemented with any other rotational system where rotational speed needs to be governed.

As previously mentioned, the brake of various embodiments of the instant disclosure employs an expanding brake disc design. By expanding in a centrifugal direction with increasing rotational speed, and thereby applying an increasing braking force as rotational speed increases, the brake limits the maximum speed of the subassembly, thereby limiting the forces that can be imparted to the mechanism to which the brake is connected. For example, the brake disclosed herein can be advantageously used in an automotive application when configured to be used in conjunction with a power strut and a power liftgate in an automobile. In this example, the brake disclosed herein limits the maximum speed at which a motor is allowed to turn during manual actuation of the liftgate, thereby preventing or substantially limiting damage to the motor caused by manual manipulation of the liftgate. In a specific example of this automotive application, the gearing between the drive motor and the strut is approximately a 50:1 ratio (i.e., the speed of the drive gear is 1/50th that of the drive motor). It should be appreciated that other similar gearing ratios may be contemplated. Furthermore, in a specific example, the motor is designed for operation at between approximately 5,000 RPM and 10,000 RPM. Again, it should be appreciated that other similar motor speeds may be contemplated.

Typically, manual operation of the liftgate tends to be done with force sufficient to move the liftgate at several times the design speed of the drive, which could force the motor to move at several times its design speed. Absent the disclosed brake, manual operation could overpower the drive components and result in drive component failure. Particularly where this overpower is likely to occur during manufacture (e.g., before the automotive glazing of a liftgate is installed), a centrifugal brake has advantageous applicability to limit the speed of the motor and protect the drive components from failure related to excessive forces.

Referring now to the Figures, FIGS. 1A to 1C illustrate a brake disc 100 that includes protrusions 102, 104, 106, 108, and expansion components 112, 114, 116, 118. Brake disc 100 also includes central hub 120. Central hub 120 is generally configured to engage with an axial shaft, such as a drive shaft of a motor (not illustrated). In an embodiment, central hub 120 engages with the axial shaft via a pinion gear. In alternate embodiments, central hub 120 engages with the axial shaft via other means, such as a keyed-slot, an interference fit, or other similar mechanical means for engaging a shaft.

As illustrated in FIGS. 1A to 1C, the brake disc 100 includes four protrusions 102, 104, 106, 108. It should be appreciated, however, that in alternate embodiments brake disc 100 has a different quantity of protrusions (e.g., three protrusions, six protrusions, or some other quantity of protrusions). Likewise, the brake disc 100 includes four expansion components 112, 114, 116, 118. It should be appreciated, however, that in alternate embodiments brake disc 100 has a different quantity of expansion components (e.g., three expansion components, six expansion components, or some other quantity of expansion components).

Each of the protrusions 102, 104, 106, 108 is coupled to the central hub 120. For example, each of the protrusions 102, 104, 106, 108 may be fixed to the central hub 120 via mechanical bonding. Likewise, each of the protrusions 102, 104, 106, 108 may be formed of the same material as the central hub 120, such that the protrusions 102, 104, 106, 108 and the central hub 120 are formed as a single piece of material. Preferably, the protrusions 102, 104, 106, 108 and the central hub 120 are formed as a single piece of material via injection molding.

Each of the protrusions 102, 104, 106, 108 extends in a perpendicular direction from the central hub 120. For example, the protrusions 102, 104, 106, 108 extend in a direction that is normal to the tangent of the central hub 120; this direction is, likewise, normal to the tangent of the axial shaft. In other embodiments, the protrusions 102, 104, 106, 108, extend outwardly, but not perpendicularly, from the axial shaft. In particular, depending on the application, it may be advantageous for the protrusions to extend outwardly in the direction of rotation, or outwardly against the direction of rotation, as needed depending on the rotational speed and braking force desired to be applied.

In a preferred embodiment, each of the protrusions 102, 104, 106, 108 is a T-shaped protrusion, extending in a perpendicular direction from the central hub 120. For example, protrusion 102 may include a first cross-sectional area and a first length extending in a perpendicular direction from the central hub 120. After the first length, the cross-sectional area of the protrusion 102 may increase (e.g., such that a second cross-sectional area is greater than the first cross-sectional area) along a second length extending in a perpendicular direction from the central hub 120. While each of the protrusions 102, 104, 106, 108 is illustrated as a T-shaped protrusion in FIGS. 1A to 1C, it should be appreciated that other geometrically shaped protrusions could be appropriate. For example, protrusions 102, 104, 106, 108 could be I-shaped (e.g., with a wide top/bottom and a narrow center section), rectangular, square, triangular, pyramidal, cylindrical, or any other geometric shape as dictated by the center of gravity of the protrusions 102, 104, 106, 108 required for the brake disc 100.

Continuing on, each of the expansion components 112, 114, 116, 118 is coupled to the central hub 120 at two locations. For example, each of the expansion components 112, 114, 116, 118 may be fixed to the central hub 120 at two locations, such as via mechanical bonding. Likewise, for example, each of the expansion components 112, 114, 116, 118 may be formed of the same material as the central hub 120 and of the protrusions 102, 104, 106, 108, such that the expansion components 112, 114, 116, 118, the central hub 120, and the protrusions 102, 104, 106, 108 are formed as a single piece of material. Preferably, the expansion components 112, 114, 116, 118, the central hub 120, and the protrusions 102, 104, 106, 108 are formed as a single piece of material (e.g., the brake disc 100) via injection molding. In an alternate embodiment, the entire brake disc 100 is formed by 3D printing or other similar plastics manufacturing methods. In an embodiment, the brake disc 100 is manufactured from a polyester or a resin. In other embodiments, the brake disc 100 is manufactured from other materials, such as metal, rubber, or other plastics or polymers.

In a different embodiment, the brake disc 100 may be formed of several different materials. For example, the central hub 120 may be formed of a first material, the protrusions 102, 104, 106, 108 may be formed of a second material, and the expansion components 112, 114, 116, 118 may be formed of a third material. Material selection may be dictated by the particular application of the brake disc 100 components. For example, the central hub 120 and the protrusions 102, 104, 106, 108 may require enhanced rigidity, and be formed of rigid polymers. By comparison, in this example, the expansion components 112, 114, 116, 118 may require enhanced flexibility, and be formed of a flexible polymer. Furthermore, individual components of the brake disc 100 may be formed of several materials. For example, the expansion components 112, 114, 116, 118 may require a first material for interfacing with the central hub 120 and a second material for interfacing with a braking surface (as described in greater detail herein) to reduce the wearing rate at the braking surface. Material variation can include different types of the similar materials (e.g., different types of polymers) and/or different materials entirely (e.g., polymers, metals, alloys, and other related materials). Material variation can be dictated by a number of mechanical properties, including mass, density, Modulus of elasticity, manufacturability, and other related mechanical properties of the materials.

As noted, each of the expansion components 112, 114, 116, 118 is coupled to the central hub 120 at two locations. For example, expansion component 112 is coupled to the central hub 120 at first location 122 and at second location 124. Each of expansion components 114, 116, 118, likewise, is coupled to the central hub 120 at two locations.

In an embodiment, each of the expansion components 112, 114, 116, 118 is coupled to the central hub 120 at two locations by flex-hinge components. For example, expansion component 112 is coupled to the central hub 120 at first location 122 and at second location 124 via first flex-hinge component 123 and second flex-hinge component 125, respectively. Each of first flex-hinge component 123 and second flex-hinge component 125 is geometrically configured to permit expansion component 112 to flex in a centrifugal direction (e.g., a centrifugal direction away from the central hub 120 and the axial shaft). In a particular embodiment, a cross-sectional area of the expansion component 112 is reduced at each of first flex-hinge component 123 and second flex-hinge component 125. For example, by reducing the cross-sectional area at each of first flex-hinge component 123 and second flex-hinge component 125, the flex-hinge components 123, 125 may more easily bend and/or stretch (e.g., via increased bending moment due to reduced cross-sectional area). Therefore, by reducing the cross-sectional area at each of first flex-hinge component 123 and second flex-hinge component 125, expansion component 112 may more easily flex in a centrifugal direction. It should be appreciated that each of expansion components 114, 116, 118, likewise, has flex-hinge components as described herein. Likewise, it should be appreciated that each of expansion components 112, 114, 116, 118 is able to move (e.g., flex) independently of the remaining expansion components.

In addition to the geometric configuration of each of the flex-hinge components 123, 125, the geometric configuration of each of the protrusions (e.g., protrusion 102) and the expansion components (e.g., expansion component 112) affect how easily the expansion component may flex in a centrifugal direction. For example, any geometric design change that affects the mass of the expansion component 112 or the center of gravity of the expansion component 112 can affect the degree to which the expansion component 112 flexes in a centrifugal direction.

Continuing on, in this configuration, each of the expansion components surrounds a portion of one of the protrusions. For example, expansion component 112 surrounds an outer periphery of protrusion 102, because expansion component 112 is coupled to the central hub 120 at two locations (e.g., first location 122 and second location 124) that are on either side of the protrusion 102. As illustrated in FIGS. 1A to 1C, the expansion component 112 surrounds protrusion 102 along its periphery; but, the expansion component 112 does not completely surround protrusion 102. For example, each of the expansion component 112 and the protrusion 102 have a substantially similar thickness (e.g., depth) near each other, such that expansion component 112 surrounds the outer periphery of protrusion 102 but does not surround the planar faces 126, 128 of protrusion 102.

A similar relationship between protrusions and expansion components is to be expected for the remaining protrusions and expansion components. More specifically, the geometric relationship between protrusion 102 and expansion component 112 may be analogous to the geometric relationship between protrusion 104 and expansion component 114, between protrusion 106 and expansion component 116, and between protrusion 108 and expansion component 118.

The expansion components 112, 114, 116, 118 collectively define a segmented periphery 130, which has a periphery surface 132. In an embodiment, the thickness (e.g., depth) of periphery 130 is greater than the thickness of the protrusions 102, 104, 106, 108 and the expansion components 112, 114, 116, 118. In a different embodiment, the thickness of periphery 130 is the same as the thickness of the protrusions 102, 104, 106, 108 and the expansion components 112, 114, 116, 118.

The segmented periphery 130 of the brake disc 100 may be configured to act as a braking surface. For example, the periphery surface 132 may contact other surfaces (as disclosed herein) to generate friction and thus create a braking force as the expansion components expand while the brake disc 100 spins faster and faster.

In an embodiment, the segmented periphery 130 further includes at least one groove, such as a groove along the periphery surface 132. In an embodiment, the segmented periphery 130 is further configured to retain an O-ring. For example, a groove along the periphery surface 132 may retain the O-ring. The O-ring may preferably be included to increase friction along the periphery surface 132, increase the outside diameter of the segmented periphery 130, and perform other related functions that could affect braking force. In a preferred embodiment, Durometer 70A O-rings are retained in a groove along the periphery surface 132.

In an embodiment, each of the expansion components 112, 114, 116, 118 further includes a latch arm. For example, expansion component 116 includes inner latch arm 134. Inner latch arm 134 may be configured to engage with at least one other expansion component. For example, inner latch arm 134 is configured to engage with outer latch arm 136, which is a portion of expansion component 114. In an embodiment, each of the expansion components can be expected to include at least an inner latch arm (e.g., inner latch arm 134) and an outer latch arm (e.g., outer latch arm 136), which engage with latch arms from other expansion components, as depicted in FIG. 1C. In this way, each of the expansion components 112, 114, 116, 118 is geometrically constrained from excessive flexing in a centrifugal direction (e.g., a centrifugal direction away from the central hub 120 and the axial shaft) by other expansion components.

Furthermore, in an embodiment, each of protrusions 102, 104, 106, 108 is configured with a particular geometry to engage with at least one expansion component, such that each of the expansion components 112, 114, 116, 118 is geometrically constrained from excessive flexing in a centrifugal direction or a radial direction by one of the protrusions 102, 104, 106, 108. For example, each of the protrusions 102, 104, 106, 108 may be a T-shaped protrusion. As previously noted, the expansion components 112, 114, 116, 118 surround protrusions 102, 104, 106, 108. By implementing a T-shaped protrusion, each of the expansion components 112, 114, 116, 118 is prevented from excessive movement in either the centripetal/centrifugal direction (e.g., a direction perpendicular or normal to the tangent of the rotational direction) or the axial direction (e.g., a direction parallel to the tangent of the rotational direction. Likewise, the T-shaped protrusions prevent each of the expansion components 112, 114, 116, 118 from "diving" in a forward or backward radial direction. By preventing diving, the protrusions 102, 104, 106, 108 ensure that the expansion components 112, 114, 116, 118 flex in the centrifugal direction, which ensures that friction forces experienced by each of the expansion components 112, 114, 116, 118 (e.g., at periphery surface 132) are effectively equal. For at least these reasons, the T-shaped protrusions provide torsional rigidity to the brake disc 100 and its components such as expansion components 112, 114, 116, 118. It should be appreciated that alternate geometric configurations of the protrusions 102, 104, 106, 108 may, likewise, provide torsional rigidity as described above.

Figure 2B:
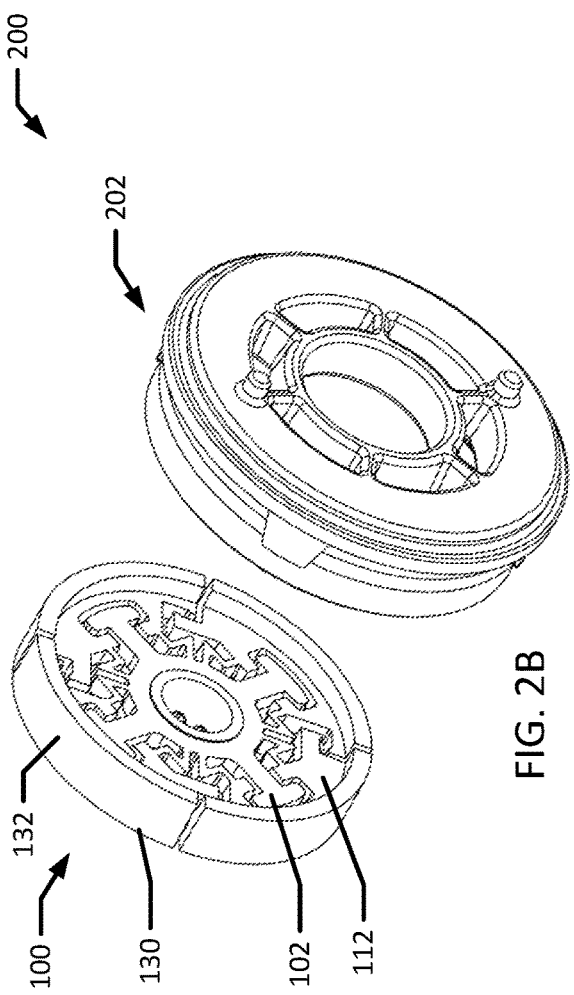
FIG. 2B illustrates a back-isometric view of a brake system according to an example of the present disclosure.

FIGS. 2A and 2B illustrate a brake system 200 that includes the brake disc 100 (e.g., brake disc 100 as described with reference to FIGS. 1A to 1C). More specifically, the brake disc 100 includes the central hub 120, which is configured to engage with an axial shaft. The brake disc 100 includes the protrusions (e.g., protrusion 102) each of which are coupled to the central hub 120 and extend perpendicularly from the central hub 120. The brake disc includes the expansion components (e.g., expansion component 112) each of which are coupled to the central hub 120 at two locations and surround an outer periphery of one of the protrusions (e.g., protrusion 102). The expansion components define the segmented periphery 130, which includes the periphery surface 132. The periphery surface 132 may be configured as a braking surface.

The brake system 200 further includes a brake drum 202. The brake drum 202 is configured to have an inner drum surface 204. The inner drum surface 204 defines an inner diameter of the brake drum 202. Likewise, the periphery surface 132 defines an outer diameter of the brake disc 100. The inner diameter of the brake drum 202, as defined by inner drum surface 204, is larger than the outer diameter of the brake disc 100, as defined by periphery surface 132. Therefore, when the brake disc 100 is disposed within the brake drum 202, the inner drum surface 204 is concentric around the segmented periphery 130 of the brake disc 100.

In a typical configuration of brake system 200, the brake disc 100 is configured to rotate (e.g., rotate with the axial shaft). In this typical configuration, the brake drum 202 is configured to be rotationally fixed (e.g., not rotate with the axial shaft).

In an embodiment, the brake drum 202 is formed as a single piece of material. Preferably, the brake drum 202 is formed as a single piece of material via injection molding. In an alternate embodiment, the entire brake drum 202 is formed by 3D printing or other similar plastics manufacturing methods. In an embodiment, the brake drum 202 is manufactured from a polyester or a resin. In other embodiments, the brake drum 202 is manufactured from other materials, such as metal, rubber, or other plastics.

As previously described, each of the expansion components 112, 114, 116, 118 may flex in a centrifugal direction (e.g., via first flex-hinge component and second flex-hinge component). Typically, this flexing is caused by a centrifugal force in the centrifugal direction.

As the brake disc 100 rotates, each of the expansion components 112, 114, 116, 118, likewise, rotates. For example, when the axial shaft rotates, the expansion components 112, 114, 116, 118 and the central hub 120 rotate about the axial shaft. This rotation causes each of the expansion components 112, 114, 116, 118 to experience a centrifugal force in the centrifugal direction (e.g., a direction perpendicular or normal to the tangent of the rotational direction). Practically speaking, each of the expansion components 112, 114, 116, 118 experience a centrifugal force in an outward direction. This centrifugal force causes each of the expansion components 112, 114, 116, 118 to flex outwardly, thus increasing the effective diameter of the brake disc 100 defined by the segmented periphery 130 and periphery surface 132. The faster the brake disc 100 rotates, the more each of the expansion components 112, 114, 116, 118 flex outwardly, and thus the greater the increase in effective diameter of the brake disc 100.

Though initially, when the brake disc 100 is disposed within the brake drum 202, the inner drum surface 204 is concentric around the segmented periphery 130 of the brake disc 100, substantial rotational speed of the brake disc 100 can cause the segmented periphery 130 to expand (e.g., via expansion components 112, 114, 116, 118 flexing centrifugally) such that the segmented periphery 130 is configured to contact the brake drum 202. For example, the periphery surface 132 may be contact the inner drum surface 204. Because the brake drum 202 is not rotating, and the brake disc 100 is rotating, contact between the periphery surface 132 and the inner drum surface 204 will cause friction between the brake disc 100 and the brake drum 202. Friction between the brake disc 100 and the brake drum 202 is dictated, in part, by the coefficient of dynamic friction between these two surfaces. This friction causes an anti-moment force in the brake disc 100, which serves to slow or reduce the rotation of brake disc 100. Accordingly, this friction may constitute a braking or limiting force on the rotation of the brake disc 100.

For example, the brake disc 100 is disposed within the brake drum 202, such that the inner drum surface 204 is concentric around the segmented periphery 130 of the brake disc 100. It has already been noted that the inner diameter of the brake drum 202, as defined by inner drum surface 204, is larger than the outer diameter of the brake disc 100, as defined by periphery surface 132. For example, a gap exists between the periphery surface 132 of the brake disc 100 and the inner drum surface 204 of the brake drum 202. As a specific example, in an initial state (e.g., no rotation), the inner diameter of the brake drum 202, as defined by inner drum surface 204, is 0.5 mm larger than the outer diameter of the brake disc 100, as defined by periphery surface 132. As the brake disc 100 rotates, the segmented periphery 130 may expand (e.g., via expansion components 112, 114, 116, 118 flexing centrifugally), such that the outer diameter of the brake disc 100, as defined by periphery surface 132, increases. At a brake disc 100 rotation of approximately 12,000 RPM, the brake disc 100 displaces an additional 0.43 mm (e.g., the outer diameter of the brake disc 100, as defined by periphery surface 132, increases 0.43 mm). Likewise, at a brake disc 100 rotation of approximately 15,000 RPM, the brake disc 100 displaces an additional 0.63 mm (e.g., the outer diameter of the brake disc 100, as defined by periphery surface 132, increases 0.63 mm)). However, practically speaking, the brake disc 100 cannot displace beyond 0.50 mm, as it is physically constrained by the brake drum 202. Therefore, at some point between 12,000 RPM and 15,000 RPM, the outer diameter of the brake disc 100, as defined by periphery surface 132 is equal to the inner diameter of the brake drum 202, as defined by inner drum surface 204. Once the diameters are equivalent, any further expansion of the brake disc 100 results in the brake disc 100 engaging (e.g., contacting the brake drum 202 and generating friction). At a brake disc 100 rotation of approximately 14,000 RPM, the brake disc 100 achieves maximum brake torque (e.g., contacting the brake drum 202 and generating maximum sufficient friction for the particular application).

It should be appreciated that the example given above, with respect to diameter spacing, RPMs, and related braking, are exemplary. Higher or lower values can and should be expected, as dictated by the specific geometry of the brake disc 100 and brake drum 202. For example, the specific geometry of the brake disc 100 can affect how the brake disc 100 performs braking functions at specific RPMs, to optimize brake disc 100 for a given application. In an embodiment, the geometric configuration of each of protrusions 102, 104, 106, 108, expansion components 112, 114, 116, 118, and flex-hinge components may be controlled by particular geometric design, to ensure that the brake disc 100 limits provides braking force at a desired rotational speed (e.g., a desired maximum RPM). In other words, geometric design of the brake disc 100 ensures that the brake disc 100 is customizable to any desired rotational speed, as dictated by an individual system. As an example, the gearing ratio between the drive motor and the strut dictates a rotational speed that will be encountered. Lower gearing ratios result in lower expected speeds. Higher gearing ratios result in expected higher speeds. Thus, it is desirable to have a centrifugal brake that can be adapted to different speed requirements, as dictated by different gearing ratios. Adaptation and customization includes, in part, the geometric configuration of the centrifugal brake, as described herein.

In a similar embodiment, spacing between the brake disc 100 and brake drum 202 may be controlled by particular geometric design (e.g., by controlling either or both of the inner diameter of the brake drum 202 defined by inner drum surface 204 and the outer diameter of the brake disc 100 defined by periphery surface 132), to ensure that the brake disc 100 and brake drum 202 are customizable to any desired rotational speed, as dictated by an individual system.

In an embodiment, the periphery surface 132 includes a coating (e.g., chemical coating) or is composed of a different material to increase material hardness and/or decrease wearing rate at the periphery surface 132. For example, the highest levels of stresses experienced by the brake disc 100 are at the segmented periphery 130, such as at periphery surface 132, due to friction forces. Likewise, in an embodiment, the inner drum surface 204 has a coating (e.g., chemical coating) or is composed of a different material to increase material hardness and/or decrease wearing rate at the inner drum surface 204.

In a preferred embodiment, each of the expansion components 112, 114, 116, 118 flex outwardly in an equal amount, such that friction forces experienced by each of the expansion components 112, 114, 116, 118 (e.g., at periphery surface 132) are effectively equal. For example, by flexing outwardly in an equal amount, frictional wear experienced by brake disc 100 is effectively distributed equally among the segmented periphery 130 at each of the expansion components 112, 114, 116, 118.

In an embodiment, the segmented periphery 130 in brake system 200 is further configured to retain an O-ring. For example, a groove along the periphery surface 132 may retain the O-ring. The O-ring may preferably be included to increase friction along the periphery surface 132 or between the periphery surface 132 and the inner drum surface 204, increase the outside diameter of the segmented periphery 130 thereby reducing the amount of expansion (e.g., via expansion components 112, 114, 116, 118 flexing centrifugally) required to generate friction between the periphery surface 132 and the inner drum surface 204, and perform other related functions that could impact braking force between the brake disc 100 and the brake drum 202.

Practically speaking the brake system 200 can be implemented in systems where a maximum RPM (e.g., a maximum RPM for an axial shaft) is required. By implementation, brake disc 100 can provide braking force once the maximum RPM is reached. In a specific example, the brake system 200 can be implemented in a power liftgate on a vehicle. As noted, the gearing, power struts, and related motors are sensitive to high RPMs. For example, prior to installation of hydraulic and pneumatic components on the liftgate, merely lifting the liftgate too quickly by hand can cause catastrophically high RPMs within the internal system. When implemented, brake drum 202 is fixed and cannot rotate; brake disc 100 is fixed to the axial shaft and spins freely (e.g., at speeds above 10,000 RPM). As the brake disc 100 spins on the axial shaft, the centrifugal force expands the brake disc 100 (as described above). Once the brake disc 100 spins above a given RPM, such as a RPM limit, the brake disc 100 expands and contacts the inner drum surface 204 of the drum 202, which is stationary. As the brake disc 100 spins faster, the normal force applied to the inner drum surface 204 of the drum 202 increases, and the friction increases. This frictional brake force is applied to the system 202, to slow or stop rotation of the axial shaft beyond the RPM limit.

Figure 3:
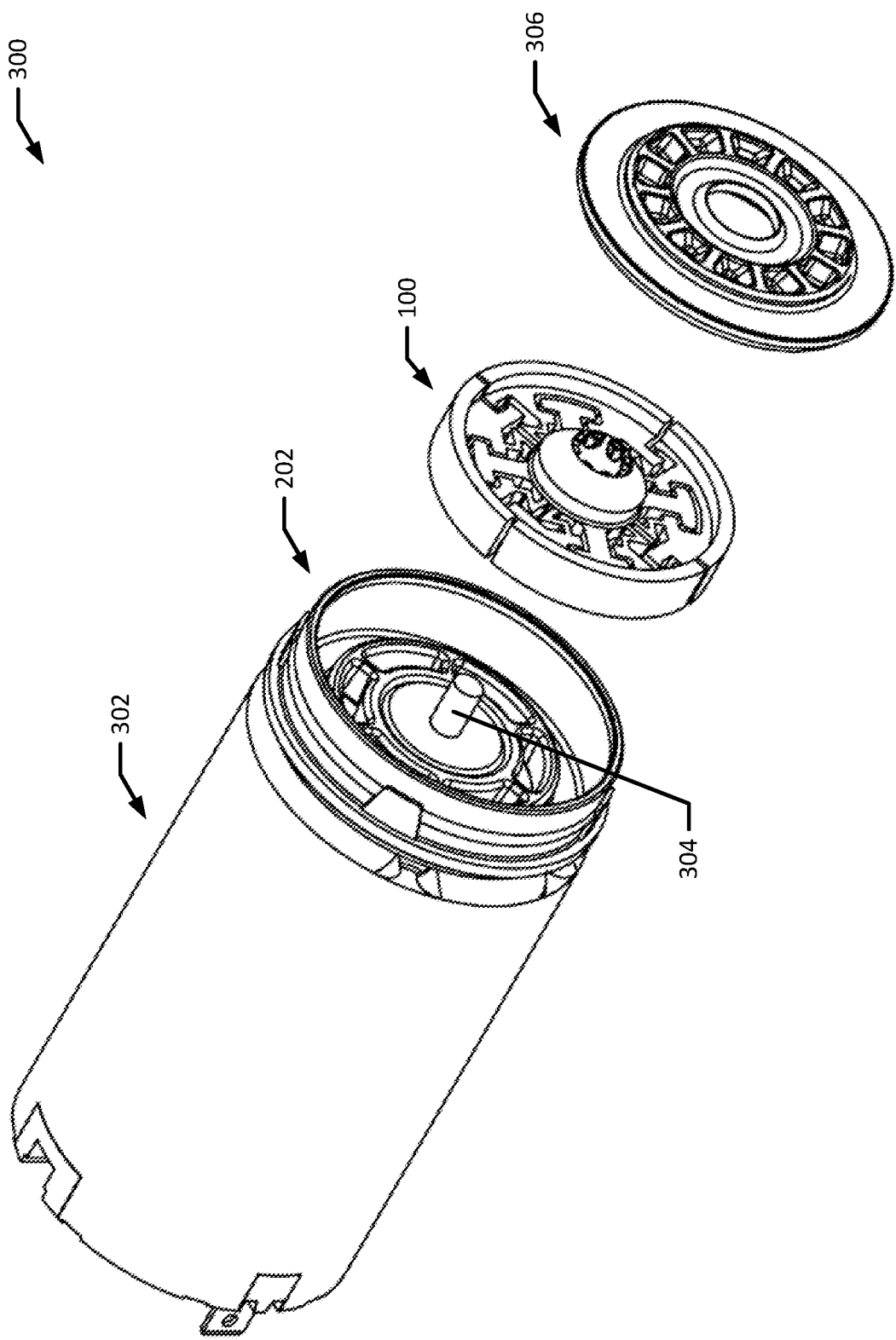
FIG. 3 illustrates a front-isometric view of a brake system according to an example of the present disclosure.

FIG. 3 illustrates a brake system 300 that includes the brake disc 100 (e.g., brake disc 100 as described with reference to FIGS. 1A to 1C) and the brake drum 202 (e.g., brake drum 202 as described with reference to FIGS. 2A and 2B). The brake system 300 may further include a motor 302, such one to be implemented with a power strut. In various embodiments, motor 302 can be an electrical motor, such as a DC or AC motor, a mechanical motor, such as an internal combustion engine, or any other type of motor for driving an axial shaft. The brake drum 202 may be fixed to the motor 302, a motor cover, or other related components.

In alternate embodiments, it should be appreciated that the brake disc 100 and the brake drum 202 can be implemented in any system where rotational speed needs to be governed or limited. For example, the brake disc 100 and brake drum 202 can be implemented in any system with a rotating shaft, such as hydraulic-driven systems, pneumatic-driven systems, gravity-driven systems, or the like.

Continuing on with FIG. 3, the brake system 300 further includes an axial shaft 304. Axial shaft 304 is similar to the axial shaft discussed above with respect to previously identified Figures. The axial shaft 304 is driven by the motor 302. Further, brake disc 100 is generally configured to engage with axial shaft 304 (e.g., via central hub 120). In an embodiment, the brake disc 100 engages with the axial shaft 304 via a pinion gear. In alternate embodiments, the brake disc 100 engages with the axial shaft 304 via other means, such as a keyed-slot, an interference fit, or other similar mechanical means for engaging axial shaft 304.

The brake system 300 may further include a brake cover 306. In an embodiment, the brake cover 306 is configured to engage with the brake drum 202. For example, brake cover 306 engages with the brake drum 202, such that the brake disc 100 is fully enclosed by the brake cover 306 and the brake drum 202. In specific examples, the brake cover 306 engages with the brake drum 202 via interference fit, snap fit, latches, fasteners, internal threading, or other similar mechanical means. By ensuring that the brake disc 100 is fully enclosed, the brake cover 306 and brake drum 202 prevent external interference (e.g., via inadvertent material such as dust or other particles) from affecting the performance of brake disc 100.

Figure 4:
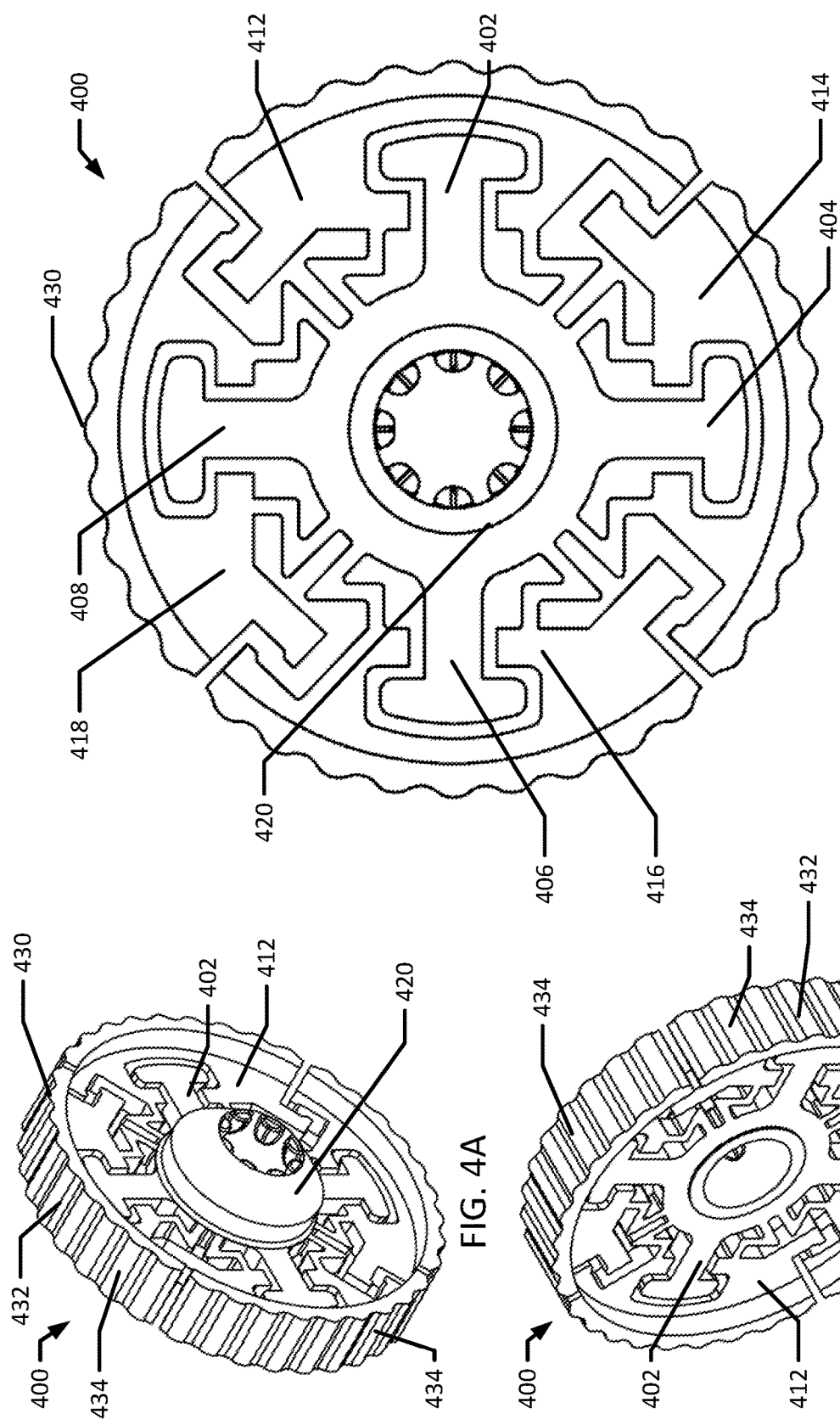
FIG. 4A illustrates a front-isometric view of a brake disc according to an example of the present disclosure.
FIG. 4B illustrates a back-isometric view of a brake disc according to an example of the present disclosure.
FIG. 4C illustrates a front view of a brake disc according to an example of the present disclosure.

FIGS. 4A to 4C illustrate a brake disc 400 that includes protrusions 402, 404, 406, 408, and expansion components 412, 414, 416, 418. It should be appreciated, however, that in alternate embodiments brake disc 400 has a different quantity of protrusions. Brake disc 400 also includes central hub 420. Central hub 420 is generally configured to engage with an axial shaft, such as a drive shaft of a motor. In an embodiment, central hub 420 engages with the axial shaft, such as via a pinion gear, a keyed-slot, an interference fit, or other similar mechanical means for engaging a shaft. Likewise, the brake disc 400 includes expansion components 412, 414, 416, 418. It should be appreciated, however, that in alternate embodiments brake disc 400 has a different quantity of expansion components.

Each of the protrusions 402, 404, 406, 408 is coupled to the central hub 420. Geometrically, the protrusions 402, 404, 406, 408 are similar to the protrusions 102, 104, 106, 108 discussed above with respect to FIGS. 1A to 1C. Preferably, the protrusions 402, 404, 406, 408 and the central hub 420 are formed as a single piece of material via injection molding. Likewise, each of the expansion components 412, 414, 416, 418 is coupled to the central hub 420 at two locations. Geometrically, the expansion components 412, 414, 416, 418 are similar to the expansion components 112, 114, 116, 118 discussed above with respect to FIGS. 1A to 1C. Preferably, the expansion components 412, 414, 416, 418, the central hub 420, and the protrusions 402, 404, 406, 408 are formed as a single piece of material (e.g., the brake disc 400) via injection molding. In a preferred embodiment, the brake disc 400 is manufactured from a polyester or a resin.

Functionally, the expansion components 412, 414, 416, 418 are expected to operate similar to the operation of expansion components 112, 114, 116, 118 discussed above with respect to FIGS. 1A to 1C; namely, the expansion components 412, 414, 416, 418 are geometrically configured to permit flexing in a centrifugal direction (e.g., a centrifugal direction away from the central hub 420 and the axial shaft).

The expansion components 412, 414, 416, 418 collectively define a segmented periphery 430, which has a periphery surface 432. The segmented periphery 430 of brake disc 400 is configured to include deflection features 434. For example, periphery surface 432 includes bumps or ridges along the periphery surface 432. The segmented periphery 430 of the brake disc 400 may be configured to act as a braking surface. For example, the periphery surface 432 may contact other surfaces to generate friction and thus create a braking force. The deflection features 434 may enhance this friction and related braking force, and generate additional deflection forces which, likewise, equate to a braking force.

Figure 5:
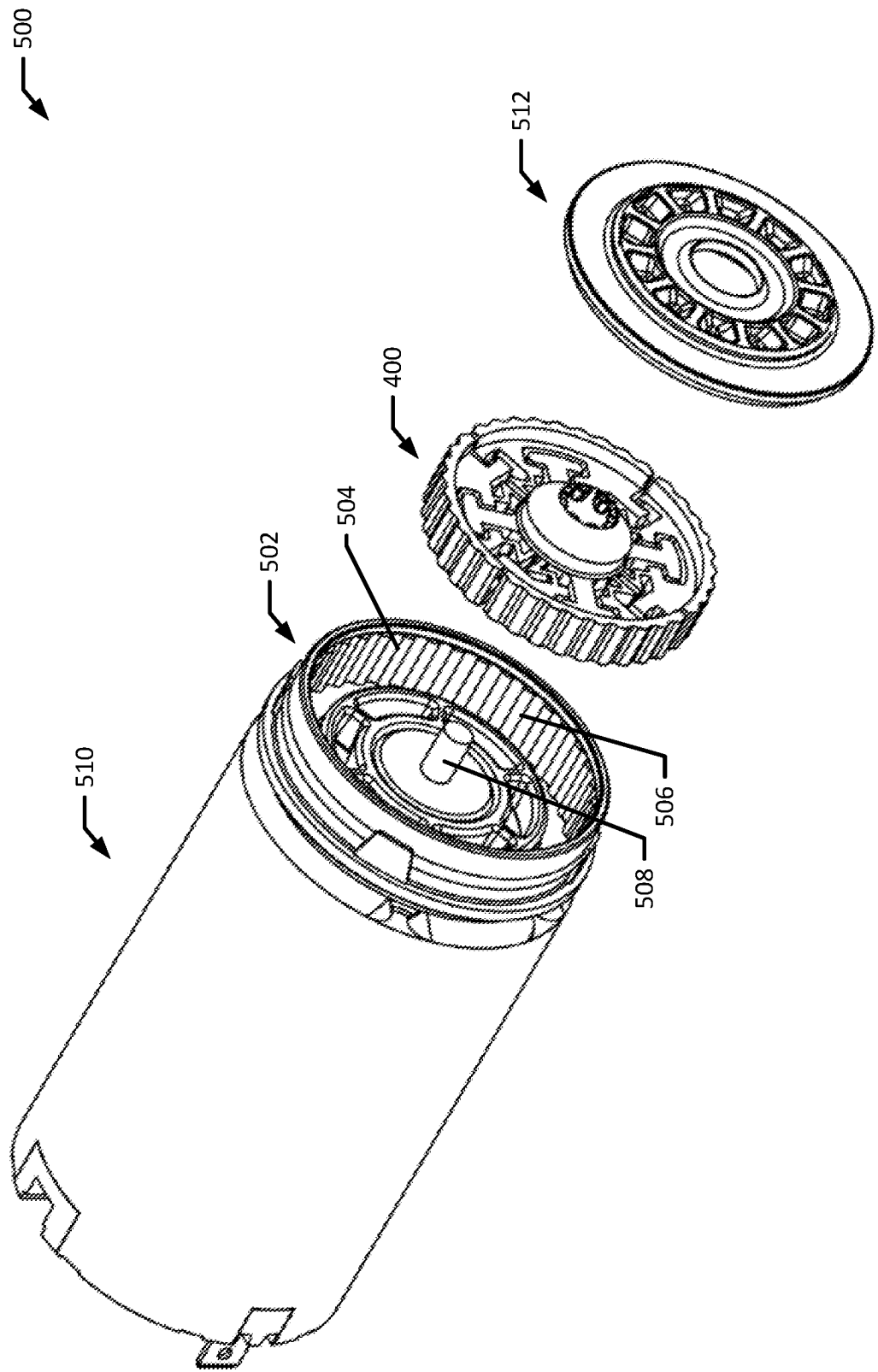
FIG. 5 illustrates a front-isometric view of a brake system according to an example of the present disclosure.

FIG. 5 illustrates a brake system 500 that includes the brake disc 400 (e.g., brake disc 400 as described with reference to FIGS. 4A to 4C). More specifically, the brake disc 400 includes the central hub 420, which is configured to engage with an axial shaft 508. The brake disc 400 includes the protrusions (e.g., protrusion 402) and the expansion components (e.g., expansion component 412). The expansion components define the segmented periphery 430, which includes the periphery surface 432. The periphery surface 432 further includes deflection features 434. The periphery surface 432 may be configured as a braking surface.

The brake system 500 further includes a brake drum 502. In a typical configuration of brake system 500, the brake disc 400 is configured to rotate (e.g., rotate with the axial shaft 508). In this typical configuration, the brake drum 502 is configured to be rotationally fixed (e.g., not rotate with the axial shaft 508). In a preferred embodiment, the brake drum 502 is manufactured from a polyester or a resin.

The brake drum 502 is configured to have an inner drum surface 504. The inner drum surface 504 defines an inner diameter of the brake drum 502. Likewise, the periphery surface 432 defines an outer diameter of the brake disc 400. The inner diameter of the brake drum 502, as defined by inner drum surface 504, is larger than the outer diameter of the brake disc 400, as defined by periphery surface 432. Therefore, when the brake disc 400 is disposed within the brake drum 502, the inner drum surface 504 is concentric around the segmented periphery 430 of the brake disc 400, such that brake disc 400 may freely rotate (e.g., irrespective of deflection features 434). Further, the inner drum surface 504 includes drum deflection features 506. For example, inner drum surface 504 includes bumps or ridges. When the brake disc 400 is at high rotational speeds, the deflection features 434 of the segmented periphery 430 of brake disc 400 may contact the drum deflection features 506 of the inner drum surface 504 to generate friction and thus create a braking force. The drum deflection features 504 may enhance this friction and related braking force, and generate additional deflection forces which, likewise, equate to a braking force.

Brake system 500 further includes a motor 510 for driving the axial shaft 508. Further, because brake disc 400 is generally configured to engage with axial shaft 508, motor 510 also drives brake disc 400. The brake system 500 may further include a brake cover 512. In an embodiment, the brake cover 512 is configured to engage with the brake drum 502. For example, brake cover 512 engages with the brake drum 502, such that the brake disc 400 is fully enclosed by the brake cover 512 and the brake drum 502. In specific examples, the brake cover 512 engages with the brake drum 502 via interference fit, snap fit, latches, fasteners, internal threading, or other similar mechanical means. By ensuring that the brake disc 400 is fully enclosed, the brake cover 512 and brake drum 502 prevent external interference (e.g., via inadvertent material such as dust or other particles) from affecting the performance of brake disc 400. Furthermore, if lubrication is used with brake system 500, the brake cover 512 and brake drum 502 effectively form a contained lubrication reservoir for brake disc 400.

Though initially, when the brake disc 400 is disposed within the brake drum 502, the inner drum surface 504 is concentric around the segmented periphery 430 of the brake disc 400, substantial rotational speed of the brake disc 400 can cause the segmented periphery 430 to expand (e.g., via expansion components flexing centrifugally) such that the segmented periphery 430 is configured to contact the brake drum 502. For example, the deflection features 434 on periphery surface 432 may contact the drum deflection features 506 of the inner drum surface 504. Because the brake drum 502 is not rotating, and the brake disc 500 is rotating, contact between the deflection features 434 and the drum deflection features 506 will cause both friction and additional deflection forces between the brake disc 400 and the brake drum 502. Accordingly, the friction and deflection forces may constitute a braking or limiting force on the rotation of the brake disc 400.

In a specific example, the brake system 500 is configured such that only deflection forces are used as a braking force of the brake disc 400. In this example, lubrication is used within the brake system 500 (e.g., contained within the brake cover 512 and brake drum 502). The lubrication reduces the friction generated between the brake disc 400 and the brake drum 502. For example, while the brake system 200 uses friction to provide a braking force, the brake system 500 may attempt to reduce friction (e.g., to reduce the wearing of brake disc 400) and instead use deflection forces to act as a braking force. More specifically, once brake disc 400 reaches a specific rotational speed, the expansion components 412, 414, 416, 418 flex outwardly. The faster the brake disc 400 rotates, the more each of the expansion components 412, 414, 416, 418 flex outwardly. Once the deflection features 434 on periphery surface 432 contact the drum deflection features 506 of the inner drum surface 504, the expansion components experience deflection forces in both centripetal/centrifugal directions (e.g., a direction perpendicular or normal to the tangent of the rotational direction) and axial directions (e.g., a direction parallel to the tangent of the rotational direction). These deflection forces are generally in opposition to the rotational direction of the brake disc 400. Therefore, these deflection forces may serve to act as counter-forces, in order to slow the brake disc 400. In this way, rotational energy of the brake disc 400 may be dissipated via the deflection forces generated from contact between the deflection features 434 on periphery surface 432 contact the drum deflection features 506 of the inner drum surface 504.

Figure 6:
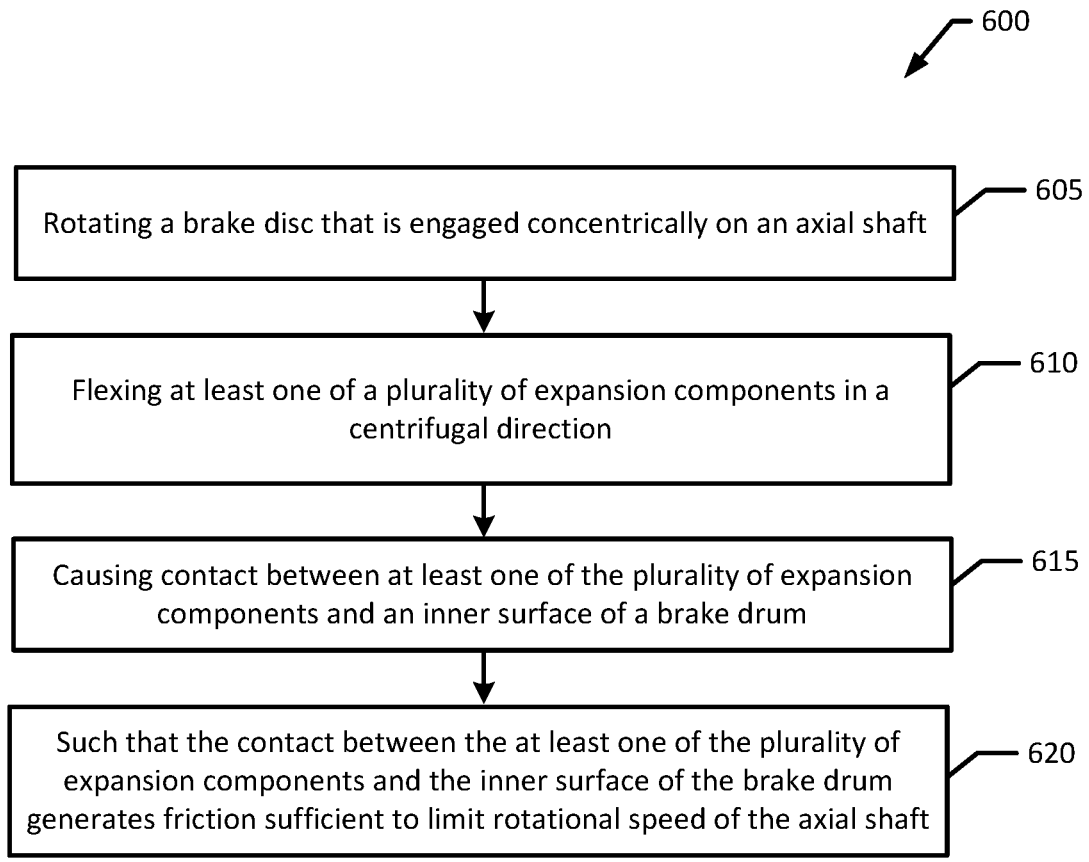
FIG. 6 illustrates a flow chart of a method of braking according to an example of the present disclosure.

FIG. 6 illustrates a flow chart of an example method 600 of braking. Although the example method 600 is described with reference to the flow diagram illustrated in FIG. 6, it will be appreciated that many other methods of performing the acts associated with the method may be used. For example, the order of some of the blocks may be changed, certain blocks may be combined with other blocks, and some of the blocks described may be optional.

The method 600 includes rotating a brake disc (e.g., brake disc 100) that is engaged concentrically on an axial shaft (e.g., axial shaft 304) (block 605). The brake disc 100 includes a central hub 120, configured to engage with the axial shaft 304. The brake disc 100 includes protrusions 102, 104, 106, 108 and expansion components 112, 114, 116, 118 coupled to the central hub 120. The expansion components 112, 114, 116, 118 define a segmented periphery 130 configured as a braking surface.

The method 600 includes flexing at least one of the expansion components (e.g., expansion component 112) in a centrifugal direction (block 610). The method then includes causing contact between the at least one expansion component (e.g., expansion component 112) and an inner surface of a brake drum (e.g., inner drum surface 204 of brake drum 202) (block 615). Lastly, the contact between the at least one expansion component (e.g., expansion component 112) and the inner surface of the brake drum (e.g., inner drum surface 204 of brake drum 202) generates friction sufficient to limit rotational speed of the axial shaft (e.g., axial shaft 304) (block 620).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention is claimed as follows:

1. A brake disc comprising:
a central hub, configured to engage with an axial shaft;
a plurality of protrusions, wherein each of the plurality of protrusions is coupled to the central hub and extends perpendicularly from the central hub; and
a plurality of expansion components, wherein each of the plurality of expansion components is coupled to the central hub at two locations, wherein each of the plurality of expansion components surrounds an outer periphery of one of the plurality of protrusions, and
wherein the plurality of expansion components define a segmented periphery configured as a braking surface, and
wherein each of the plurality of protrusions is configured to include:
a first portion having a first cross-sectional area and a first length, the first portion coupled to the central hub and extending perpendicularly from the central hub, and
a second portion having a second cross-sectional area and a second length, the second cross-sectional area being greater than the first cross-sectional area, the second portion coupled to the first portion and extending perpendicularly from the first portion.

2. The brake disc of claim 1, wherein the central hub engages with the axial shaft via a pinion gear.

3. The brake disc of claim 1, wherein each of the plurality of expansion components is coupled to the central hub at two locations by flex-hinge components, which are geometrically configured to permit each of the plurality of expansion components to flex in a centrifugal direction.

4. The brake disc of claim 3, wherein a cross-sectional area of any one of the plurality of expansion components is reduced at the flex-hinge components.

5. The brake disc of claim 1, wherein each of the plurality of expansion components includes a latch arm configured to engage with at least one other of the plurality of expansion components.

6. The brake disc of claim 1, wherein the segmented periphery is further configured to retain an O-ring.

7. The brake disc of claim 1, wherein the segmented periphery is further configured to include a plurality of deflection features.

8. The brake disc of claim 1, wherein the plurality of protrusions includes four protrusions and the plurality of expansion components includes four expansion components.

9. A brake system comprising:
a brake disc including:
a central hub, configured to engage with an axial shaft;
a plurality of protrusions, wherein each of the plurality of protrusions is coupled to the central hub and extends perpendicularly from the central hub
a plurality of expansion components, wherein each of the plurality of expansion components is coupled to the central hub at two locations, wherein each of the plurality of expansion components surrounds an outer periphery of one of the plurality of protrusions, and
wherein the plurality of expansion components define a segmented periphery configured as a braking surface, and
wherein each of the plurality of protrusions is configured to include:
a first portion having a first cross-sectional area and a first length, the first portion coupled to the central hub and extending perpendicularly from the central hub and
a second portion having a second cross-sectional area and a second length, the second cross-sectional area being greater than the first cross-sectional area, the second portion coupled to the first portion and extending perpendicularly from the first portion; and
a brake drum configured to have an inner diameter that is larger than an outer diameter of the brake disc, the outer diameter of the brake disc defined by the segmented periphery, such that an inner surface of the brake drum is concentric around the segmented periphery of the brake disc.

10. The brake system of claim 9, wherein the brake disc is configured to rotate with the axial shaft, and wherein the brake drum is configured to be rotationally fixed, such that the brake drum does not rotate.

11. The brake system of claim 9, wherein the segmented periphery of the brake disc is configured to contact the inner surface of the brake drum.

12. The brake system of claim 11, wherein contact between the segmented periphery of the brake disc and the inner surface of the brake drum is caused responsive to at least one of the plurality of expansion components flexing in a centrifugal direction.

13. The brake system of claim 9, wherein the segmented periphery of the brake disc is further configured to retain an O-ring, such that the O-ring is configured to contact the inner surface of the brake drum.

14. The brake system of claim 9, wherein each of the segmented periphery of the brake disc and the inner surface of the brake drum are configured to include a plurality of deflection features, such that the plurality of deflection features of the segmented periphery are configured to contact the plurality of deflection features of the inner surface of the brake drum.

15. The brake system of claim 9, further comprising a brake cover, wherein the brake cover is configured to engage with the brake drum, such that the brake disc is fully enclosed by the brake cover and the brake drum.

16. The brake system of claim 9, wherein the axial shaft is driven by a motor.

17. The brake system of claim 9, wherein the brake disc is manufactured from a polyester.

18. The brake system of claim 9, wherein the brake disc is manufactured from a resin.

19. A method of braking comprising:
rotating a brake disc that is engaged concentrically on an axial shaft, wherein the brake disc includes:
a central hub, configured to engage with the axial shaft,
a plurality of protrusions, wherein each of the plurality of protrusions is coupled to the central hub and extends perpendicularly from the central hub,
a plurality of expansion components, wherein each of the plurality of expansion components is coupled to the central hub at two locations, wherein each of the plurality of expansion components surrounds an outer periphery of one of the plurality of protrusions, and
wherein the plurality of expansion components define a segmented periphery configured as a braking surface, and
wherein each of the plurality of protrusions is configured to include:
a first portion having a first cross-sectional area and a first length, the first portion coupled to the central hub and extending perpendicularly from the central hub, and
a second portion having a second cross-sectional area and a second length, the second cross-sectional area being greater than the first cross-sectional area, the second portion coupled to the first portion and extending perpendicularly from the first portion;
flexing at least one of the plurality of expansion components in a centrifugal direction; and
causing contact between the at least one of the plurality of expansion components and an inner surface of a brake drum,
such that the contact between the at least one of the plurality of expansion components and the inner surface of the brake drum generates friction sufficient to limit rotational speed of the axial shaft.

* * * * *